Figure 2:
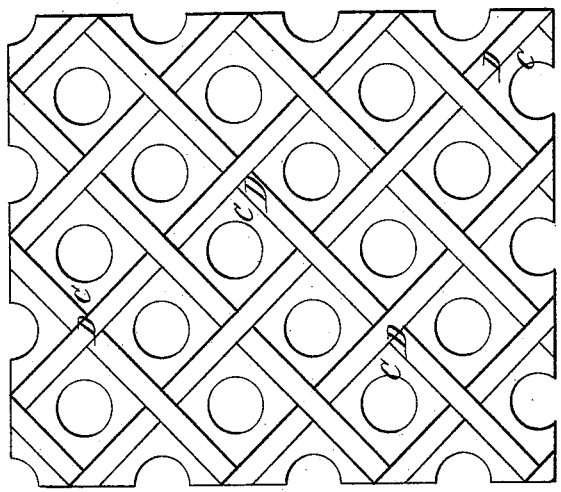

(No Model.)

C. BARDY.
PROCESS OF PURIFYING FATTY ACIDS.

No. 406,158. Patented July 2, 1889.

WITNESSES:
J. L. Leaplinger
E. B. Bolton

INVENTOR:
Charles Bardy
By Henry Connett
Atty.

UNITED STATES PATENT OFFICE.

CHARLES BARDY, OF PARIS, ASSIGNOR TO MARIE VICTOIRE BRISSET PETIT, OF ST. DENIS, FRANCE.

PROCESS OF PURIFYING FATTY ACIDS.

SPECIFICATION forming part of Letters Patent No. 406,158, dated July 2, 1889.

Application filed August 10, 1888. Serial No. 282,439. (No specimens.) Patented in France July 10, 1888, No. 191,721, and in England July 16, 1888, No. 10,296.

*To all whom it may concern:*

Be it known that I, CHARLES BARDY, a citizen of the French Republic, residing in Paris, France, have made certain Improvements in the Purification of Fatty Acids, (for which Letters Patent have been granted in Great Britain, No. 10,296, dated July 16, 1888, and in France, No. 191,721, dated July 10, 1888,) of which the following is a specification.

My invention relates to the purification of the more or less solid acids from fatty substances and the separation of these acids from the liquid fatty acids.

The fatty acids resulting from the saponification of oils and of vegetable and animal fats consist of a mixture in variable proportions of the more or less solid acids—as margaric, stearic, palmitic, &c.—with liquid fatty acids. To render these mixed products fit for the manufacture of candles, &c., it is necessary to effect as complete a separation as possible of the solid and liquid acids, and this has been heretofore accomplished more or less successfully with presses and by both the hot and cold methods.

The process which forms the subject of this application has in view the purification of the fatty acids under new and more advantageous conditions than those hitherto practiced, so far as I know, and it is based on a property possessed by the fatty acids of crystallizing in certain solvents. The liquid acids mixed therewith which are not possessed of this physical property remain in solution in the solvent. Any neutral solvents may be used for carrying out my process. I will specify as suitable solvents benzine, essence of turpentine, petroleum naphtha, wood spirit, acetone, ethyl, amyl, propyl or butyl alcohols, bisulphide of carbon, ether, &c. If the solvent chosen is not soluble, or only very slightly soluble, in water, the fatty acids are dissolved therein under the influence of heat in such a manner as to obtain a strongly-charged solution. Then this solution is allowed to cool, either to the ordinary temperature or to a lower temperature, produced by artificial means, until the solid acid crystallizes. The mother-liquor is now separated and the crystals washed with the primitive liquid saturated (while cold) with stearic acid in such a manner as to remove the last traces of liquid fatty acid. Finally, the solvent is driven off with a jet of steam.

In many cases it is preferable to employ solvents that are soluble in water, and in such cases we may employ the solvent pure or mixed with water. In the latter case the quantity of water to be added should be such that the mixed liquid will readily dissolve the acid to be purified, preserving at the same time the power of retaining in solution, while cold, the liquid fatty acids; but the dilution should be carried to such an extent that a very slight addition of water thereto will suffice to precipitate the liquid acid remaining in the mother-liquor after the crystallization. The quantity of the solvent to be employed, as well as the quantity of water to be added to the solvent, will vary according to the nature of the acid to be purified, and according to the affinity of this acid for the liquid acid mixed therewith—with alcohol or wood-spirit, for example—it will serve to take from one to ten parts of the solution containing from sixty-five to eighty per cent. of alcohol and from twenty to thirty-five parts of water, and dissolve the crude acids in this solution at a temperature of from 30° to 40° centigrade, and to cool the solution to from 6° to 10° centigrade. The addition of water to the mother-liquor leaves the liquid acid supernatant, and the alcohol, after concentration, may be again employed. If a very thorough purification is required, the product may be crystallized anew, in which case the mother-liquor, containing but little liquid acid, may be employed for the first or primary crystallization of the acid.

I have now described the method of purification. In carrying this method into practice any suitable apparatus may be employed; but it must be remarked, in choosing an apparatus for the purpose, that the solid acids, whatever may be their nature and the material from which they are obtained, will crystallize from the chosen solvent in the form of very minute crystals, so voluminous as to render the liquid an almost semi-solid mass when cooled to the proper point. This minute division of the acid, which in itself is in a certain sense quite important, as it greatly aids in the purification of the product, also renders the separation of the crystals from the solution very difficult; and the economical separation of the crystals from the volatile solvent is rendered the more difficult by reason of the loss of the latter from evaporation, unless proper precautions are taken.

It results from the preceding observations that the separation ought to be effected in close or tight apparatuses, as nearly hermetic as possible.

The apparatus to which recourse may be had can be ranged under three heads—namely, presses, centrifugal apparatus, and apparatus based on the formation of a vacuum.

*Presses.*—By reason of the extreme subdivision of the crystalline mass, it is impossible to press the crystals in large masses, and under such circumstances it is necessary to employ a press with large surfaces. The best results may be obtained with those presses known as "filter-presses" and "continuous presses." The cloths of the continuous presses ought to be of close texture. The liquid charged with the crystals is brought onto the platform of the press and spread to such a thickness that the resulting sheet of solid acid, after pressure, will be only a few millimeters in thickness. Some mechanical device—as a brush, a blade, a helicoidal strip, &c.—placed at the end of the filtering-platform at the point where the cloth is unfolded will remove the sheet of acid from the cloth and clean it thoroughly. The filter-press, if employed, should have extended surfaces, and have very shallow chambers. The washing of the cakes of acid may be effected while they are in the press.

*Centrifugal apparatus.*—This apparatus may also be employed, and it will effect a very perfect separation of the acids. The apparatus should be closed tight and be fed by means of conduits of special construction opening into the drum. In practice I think it advisable to combine this class of centrifugal apparatus with the class of vacuum apparatus which I will now describe.

*Vacuum apparatus.*—This apparatus is of two kinds—intermittent and continuous. The intermittent apparatus consists of a box with filtering-surfaces, the interior of said box being connected with an air-exhauster or pump. The thick liquid is spread in a thin layer over the filtering-surface, which latter is covered with a closely-woven cloth. The liquid which passes through this filtering-surface is constantly drawn off by the pump, and the solid acid, suitably dried, is removed, after having been washed with a cold solvent to remove traces of liquid acid, &c. The continuous apparatus may be of several types. I will describe, as an example, with reference to the accompanying drawings, an apparatus which I have employed with good results.

Figure 1:
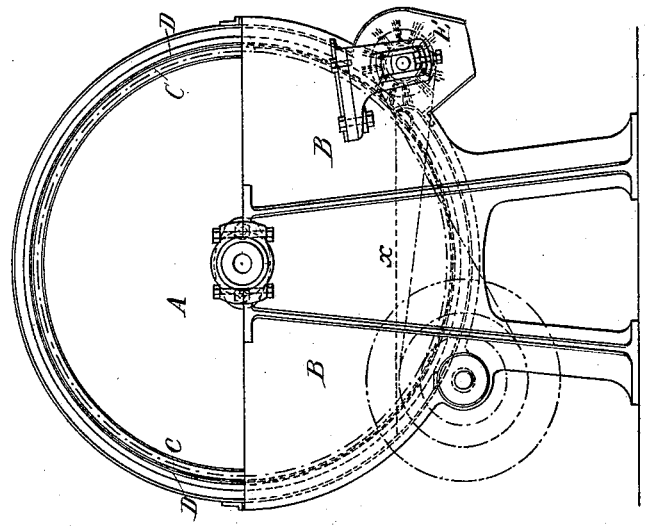

Figure 1 is a side elevation of the machine or apparatus on a small scale; and Fig. 2 is a view, on a very large scale, of a fragment of the perforated metal and covering fabric employed therein.

A is a drum or cylinder which is rotatively mounted in a stationary tank B, which latter is supplied in a continuous manner with the liquid to be separated. The filtering-surface is formed of a sheet of perforated metal C, of which a portion is seen enlarged in Fig. 2, over which is placed a coarse woven fabric D, also seen in Fig. 2. The interior of the drum is put in communication with a pump through the hollow trunnion of the drum. The liquid is gradually drawn or forced through the filtering-surface into the drum, from which it passes out through a suitable pipe. This prevents the liquid from accumulating in the drum. When the drum is set to rotating, the liquid drawn in by the pump leaves on the exterior filtering-surface a thin coating of the solid fatty acid, which is acted upon by the vacuum during the time it is above the level $x$ of the liquid in the trough or tank B; but when it is about to plunge again into the liquid it is removed by a rotating brush E or other similar removing device. As soon as the cleaned surface of the drum enters the liquid, it again becomes coated with the acid. Thus the drum takes up the acid and the brush removes it in a continuous manner, the operation being somewhat like that of making a continuous strip of paper on a Fourdrinier machine.

This apparatus may take other forms—notably, the cylinder or drum may be replaced by a horizontal rotative table furnished with a filtering-surface on which the liquid to be filtered will be fed, the sheet of solid acid being removed by a brush or scraper.

In this apparatus the velocity of the drum or table will be regulated according to the composition of the liquid to be filtered, in order to give the solid acid time to completely separate itself from the mother-liquor.

For completing the process where solvents soluble in water—wood-spirit, alcohol, acetone, &c.—have been employed, it is important to be able to recover the solvents without recourse to distillation. This may be effected by agitating the liquid (previously freed from the liquid fatty acids by the addition of a little water) with salts void of water, as carbonate of potash or pearlash, for example. A methodic treatment with these salts or solutions will have the effect of removing almost all of the water from the solvent, thus putting it in a proper condition for re-employment in the process. If the alcohol, after concentration, carries with it in solution a small quantity of the salt, this may be precipitated by addition of proper reagents. Under ordinary circumstances this recourse to distillation or to the use of a salt for the concentration of the solvent need only be had after the solvent shall have been used a number of times and have become charged with impurities.

Having thus described my invention, I claim—

The herein-described method of separating solid from liquid fatty acids, which consists in dissolving the mixed acids in a solvent soluble in water, as alcohol or wood-spirit, for example, under the influence of heat and then cooling the solution until the solid acid crystallizes, then removing the crystals, then adding water to the mother-liquor, whereby it is diluted and the liquid acids are thus caused to separate from the solvent, and then removing said liquid acids, substantially as set forth.

In witness whereof I have hereunto signed my name in the presence of two subscribing witnesses.

CHARLES BARDY.

Witnesses:
R. J. PRESTON,
CHARLES MARDELET.